3,222,403
STABILIZED FORMALDEHYDE SOLUTIONS
George N. Butter, Terre Haute, Ind., assignor to Commercial Solvents Corporation, New York County, N.Y., a corporation of Maryland
No Drawing. Filed June 5, 1961, Ser. No. 114,602
11 Claims. (Cl. 260—606)

My invention relates to stabilized formaldehyde solutions. More particularly, my invention relates to formaldehyde solutions stabilized against excessive polymerization and to a method for stabilizing formaldehyde solutions.

Formaldehyde, a product used in large quantities in the chemical industry, is generally transported as a 35–50% aqueous solution. The transportation of such solutions, however, is aggravated by the tendency of formaldehyde to polymerize and then settle out as a polymerized solid from the solution. Polymerization and concurrent deposition increase with decreases in temperature thus, during the cold seasons, transportation of concentrated formaldehyde solutions becomes impractical.

Various procedures have been attempted to minimize polymerization and solid deposition in formaldehyde solutions. For example, very low concentrations of formaldehyde in the solution on the order of 5–10% can be transported even in cold weather without excessive polymerization and deposition. However, since water is the main component, this method is practical only when small amounts of formaldehyde are transported. Also, various preservatives such as methanol, when incorporated in amounts of about 15–20% into the formaldehyde solution, have demonstrated ability to impede polymerization. The addition of such large amounts of methanol, however, not only is costly but necessitates separation of the methanol from the formaldehyde solution before use can be made of the formaldehyde. More recently it has been found that small amounts of hydroxylamine hydrochloride impede but do not completely prevent polymerization of formaldehyde and deposition from the aqueous solution of the solid polymerized material even under the low temperature conditions. However, the difficulty in using hydroxylamine hydrochloride is that the material which does polymerize and settle as a solid deposit from the formaldehyde solution on subjection to lower temperature does not return to solution with a subsequent rise in temperature thus resulting not only in loss of material but necessitating the separation of the polymerized solid material from the formaldehyde solution.

I have now discovered means whereby formaldehyde solutions of industrial concentrations can be substantially preserved against polymerization and deposition of solid material even when subjected to lower temperatures. More important, however, my invention permits return of polymerized solid materials which have been deposited at low temperatures to solution merely by raising the temperature of the solution.

Generally my invention involves addition of polymerization retarding amounts of compounds having the following general formula to formaldehyde solutions:

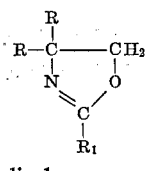

wherein R is the radical $$H(OCH_2CH)_xOCH_2-$$
$$\phantom{H(OCH_2}R_2$$

wherein $R_1$ is alkyl, wherein $R_2$ is hydrogen or lower alkyl, and wherein $x$ is an integer ranging from 1–20.

A process for the preparation of my polymerization inhibitors is described in co-pending Serial No. 114,601, filed June 5, 1961, now abandoned. In general, this process consists of oxyalkylating an oxazoline having the following general formula:

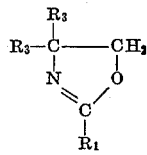

wherein $R_1$ is defined as above and wherein $R_3$ is hydroxymethyl with a monoepoxyalkylene oxide at temperatures ranging from about 0 to about 150° C. in the presence of an alkaline catalyst.

Included among the inhibitors of my invention are 4,4-bis(4-hydroxy-2-oxabutyl) - 2 - heptadecenyl - 2-oxazoline, 4,4-bis(4-hydroxy-3-methyl-2-oxabutyl) -2- heptadecyl-2-oxazoline, 4,4-bis(4-hydroxy-3-ethyl-2-oxabutyl)-2-nonyl-2-oxazoline, 4,4-bis,(10-hydroxy-2,5,8-trioxadecyl)-2-heneicosyl-2-oxazoline, 4,4-bis(16-hydroxy-2,5,8,11,14-pentaoxaheptadecyl)-2-hendecyl-2-oxazoline, etc., and the like.

In carrying out my improved process, I have found that when amounts as low as 10 p.p.m. and as high as 500 p.p.m. by weight of my inhibitors, based on the weight of the formaldehyde solution, are incorporated in the formaldehyde solution, suitable results can be obtained. However, to obtain optimum results, I usually prefer to utilize from about 50 to about 200 p.p.m. of my inhibitors.

The following examples serve to illustrate my invention, but it is not intended that my invention be limited to the procedures or specific materials set forth therein.

Example I

A 1,000 milliliter portion of a 44% formaldehyde solution containing a concentration of about 50 p.p.m. of 4,4-bis(4-hydroxy-2-oxabutyl) - 2-heptadecenyl - 2-oxazoline and a 1,000 milliliter portion of a 44% formaldehyde solution containing no inhibitor were heated to about 100° F. and maintained at that temperature for 30 days. At the end of the 30-day period, the two portions were observed. The first portion containing the inhibitor showed only a small amount of solid deposition while the second portion containing no inhibitor was quite cloudy and showed a great deal of solid deposition. The temperature of the two portions was then lowered to 60° F., and solid deposition occurred in each portion. The two portions were then heated to 120° F. with accompanying agitation. The solid material in the inhibited portion was observed to have substantially disappeared while the solid material in the portion not treated with the inhibitor was observed to be substantially unchanged.

Example II

The procedure of Example I was followed except that 4,4-bis(4-hydroxy-3-methyl-2-oxabutyl) - 2 - heptadecyl-2-oxazoline was utilized instead of 4,4-bis(4-hydroxy-2-oxabutyl)-2-heptadecnyl-2-oxazoline. Results similar to those of Example I were obtained.

Example III

The procedure of Example I was followed with the exception that 4,4 - bis(4-hydroxy-3-ethyl-2-oxabutyl)-2-nonyl-2-oxazoline was utilized instead of 4,4-bis(4-hydroxy-2-oxabutyl)-2-heptadecenyl - 2-oxazoline. Results similar to those of Example I were obtained.

Example IV

The procedure of Example I was followed with the exception that 4,4-bis(10-hydroxy - 2,5,8-trioxadecyl)-2-heneicosyl-2-oxazoline was utilized instead of 4,4-bis(4-hydroxy-2-oxabutyl)-2-heptadecenyl-2-oxazoline. Results similar to those of Example I were obtained.

Example V

The procedure of Example I was followed with the exception that 4,4-bis(16-hydroxy - 2,5,8,11,14-pentaoxaheptadecyl)-2-hendecyl-2-oxazoline was utilized instead of 4,4-bis(4-hydroxy-2-oxabutyl) - 2-heptadecenyl - 2-oxazoline. Results similar to those of Example I were obtained.

Now having described my invention, what I claim is:

1. An aqueous formaldehyde solution comprising an aqueous formaldehyde solution having a tendency to polymerize and a sufficient amount of a compound having the following general formula:

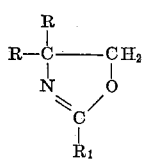

wherein R is the radical

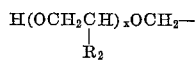

wherein $R_1$ is alkyl, $R_2$ is selected from the group consisting of lower alkyl and hydrogen, and $x$ is an integer ranging from 1–20 to stabilize said solution against deposition of solid material from the solution.

2. An aqueous formaldehyde solution comprising aqueous formaldehyde and a sufficient amount of 4,4-bis(4-hydroxy-2-oxabutyl)-2-heptadecenyl-2-oxazoline to stabilize said solution against deposition of solid material from the solution.

3. An aqueous formaldehyde solution comprising aqueous formaldehyde and a sufficient amount of 4,4-bis(4-hydroxy-3-methyl-2-oxabutyl) - 2-heptadecyl-2-oxazoline to stabilize said solution against deposition of polymerized formaldehyde from the solution.

4. An aqueous formaldehyde solution comprising aqueous formaldehyde and a sufficient amount of 4,4-bis(4-hydroxy-3-ethyl-2-oxabutyl)-2-nonyl-2-oxazoline to stabilize said solution against deposition of polymerized formaldehyde from the solution.

5. An aqueous formaldehyde solution comprising aqueous formaldehyde and a sufficient amount of 4,4-bis(10-hydroxy-2,5,8-trioxadecyl) - 2-heneicosyl-2-oxazoline to stabilize said solution against deposition of polymerized material from the solution.

6. An aqueous formaldehyde solution comprising aqueous formaldehyde and a sufficient amount of 4,4-bis(16-hydroxy-2,5,8,11,14-pentaoxahexadecyl) - 2-hendecyl-2-oxazoline to stabilize said solution against deposition of polymerized material from the solution.

7. An aqueous formaldehyde solution comprising an aqueous formaldehyde and from about 10 p.p.m. to about 500 p.p.m. of a compound having the following general formula:

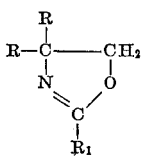

wherein R is the radical

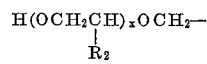

wherein $R_1$ is alkyl, wherein $R_2$ is selected from the group consisting of hydrogen and lower alkyl, and wherein $x$ is an integer ranging from 1 to 20.

8. An aqueous formaldehyde solution comprising an aqueous formaldehyde and from about 50 to about 200 p.p.m. of a compound having the following general formula:

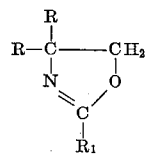

wherein R is the radical

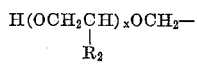

wherein $R_1$ is alkyl, wherein $R_2$ is a member selected from the group consisting of hydrogen and lower alkyl, and wherein $x$ is an integer ranging from 1 to 20.

9. The aqueous formaldehyde solution of claim 1 wherein $R_1$ is an alkyl radical having a carbon chain length of up to 21 carbon atoms and $R_2$ is lower alkyl.

10. The aqueous formaldehyde solution of claim 1 wherein $R_1$ is an alkyl radical having a carbon chain length of up to 21 carbon atoms and $R_2$ hydrogen.

11. An aqueous formaldehyde solution stabilized against polymerization comprising an aqueous formaldehyde solution of concentrations containing 30 to 50% formaldehyde and an amount of a compound having the following general formula:

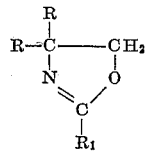

wherein R is the radical

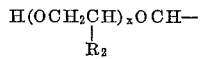

wherein $R_1$ is alkyl, wherein $R_2$ is a member selected from the group consisting of hydrogen and lower alkyl, and wherein $x$ is an integer ranging from 1 to 20, sufficient to stabilize said solution against polymerization and deposition of solid material from the solution.

References Cited by the Examiner

UNITED STATES PATENTS

| | | | |
|---|---|---|---|
| 1,766,760 | 6/1930 | Morton | 260—601 |
| 2,000,152 | 5/1935 | Walker | 260—606 |
| 2,237,092 | 4/1941 | Swain et al. | 260—606 |
| 2,517,893 | 8/1950 | Larchar | 252—171 |
| 3,033,663 | 5/1962 | De Gray | 44—63 |

FOREIGN PATENTS 871,196  6/1958  Great Britain.

OTHER REFERENCES

Derwent, Belgian Patents Report, vol. 60B, Jan. 15, 1960, page C18.

LEON ZITVER, *Primary Examiner.*

CHARLES B. PARKER, *Examiner.*